(12) United States Patent
Bowne (10) Patent No.: US 8,764,369 B2
(45) Date of Patent: Jul. 1, 2014

(54) FOLDING BALE SPEAR SYSTEM

(75) Inventor: Dale L. Bowne, White, SD (US)

(73) Assignee: Dale L. Bowne, White, SD (US)

( * ) Notice: Subject to any disclaimer, the term of this patent is extended or adjusted under 35 U.S.C. 154(b) by 106 days.

(21) Appl. No.: 13/190,587

(22) Filed: Jul. 26, 2011

(65) Prior Publication Data

US 2013/0028686 A1    Jan. 31, 2013

(51) Int. Cl.
*A01D 87/12*    (2006.01)
*A01D 87/00*    (2006.01)

(52) U.S. Cl.
USPC ........... 414/24.5; 414/721; 414/911; 414/703

(58) Field of Classification Search
USPC ............. 187/237; 294/106, 107, 61; 414/111, 414/24.5, 24.6, 621, 633, 653, 665, 685, 414/705, 720, 911, 920
See application file for complete search history.

(56) References Cited

U.S. PATENT DOCUMENTS

| | | | | |
|---|---|---|---|---|
| 2,271,624 A | * | 2/1942 | Cochran | 414/665 |
| 2,706,062 A | * | 4/1955 | Turner et al. | 414/665 |
| 2,721,668 A | * | 10/1955 | Elsner | 414/665 |
| 3,363,929 A | * | 1/1968 | Nelson | 294/198 |
| 3,529,735 A | * | 9/1970 | Wehde | 414/739 |
| 3,672,525 A | * | 6/1972 | Schaedler | 414/629 |
| 3,866,780 A | * | 2/1975 | Miller et al. | 414/623 |
| 3,901,397 A | * | 8/1975 | Brock | 414/459 |
| 3,929,366 A | * | 12/1975 | Keverline | 294/198 |
| 3,934,726 A | | 1/1976 | Martin | |
| 3,945,208 A | * | 3/1976 | O'Connor | 60/420 |
| 4,050,599 A | * | 9/1977 | Bender | 414/659 |
| 4,073,532 A | * | 2/1978 | Blair | 414/24.5 |
| 4,095,706 A | * | 6/1978 | Schwien et al. | 414/24.6 |
| 4,129,223 A | * | 12/1978 | Probst | 414/607 |
| 4,144,982 A | * | 3/1979 | Lundqvist | 414/666 |
| 4,349,305 A | * | 9/1982 | Wynn et al. | 414/408 |
| 4,411,571 A | * | 10/1983 | Gildon | 414/24.5 |
| 4,514,127 A | * | 4/1985 | Maier | 414/24.6 |
| 4,518,299 A | * | 5/1985 | Vanderlei | 414/24.6 |
| 4,648,769 A | | 3/1987 | Stirling | |
| 4,911,596 A | | 3/1990 | Fetter | |
| 5,106,253 A | | 4/1992 | Wedin | |
| 5,584,636 A | | 12/1996 | Ramsey | |
| 5,651,653 A | | 7/1997 | Bablo | |
| 5,829,940 A | * | 11/1998 | Mahaney | 414/111 |
| 6,224,122 B1 | * | 5/2001 | Glenn | 294/198 |
| 7,243,691 B1 | * | 7/2007 | Tesinsky et al. | 144/34.5 |
| 2010/0040436 A1 | * | 2/2010 | Bruha et al. | 414/24.5 |

* cited by examiner

*Primary Examiner* — Gregory Adams
(74) *Attorney, Agent, or Firm* — Scott R. Cox (57) ABSTRACT

A folding bale spear system including a frame securable to a farm implement, particularly a tractor, left and right fork posts rotatable secured to the frame, left and right bale spears, one secured to the left fork post and one secured to the right fork post, and a system for rotation of the left and right fork posts about the frame such that in an open position, the bale spears are extended rearwardly from the frame, and in a closed position the bale spears cross each other and are rotated to a position substantially parallel to the frame.

7 Claims, 8 Drawing Sheets

FOLDING BALE SPEAR SYSTEM

RELATED APPLICATION

None

FIELD OF THE INVENTION

This invention relates to a system for attachment to farm equipment for moving round hay bales and more particularly, relates to a folding bale spear system mountable to conventional farm equipment, such as a tractor, and adapted for use with an hydraulic system of the tractor or manual use to receive and move round bales of hay. More particularly, this invention relates to a folding bale spear system, which contains a means for rotation of left and right bale spears of the bale spear system from an open position, where the bale spears are extended rearwardly from the tractor, to a closed position, where the bale spears cross each other as they are rotated to the closed position, which is approximately 90 degrees from their rearwardly facing position.

BACKGROUND OF INVENTION

This section is intended to introduce the reader to art that may be related to various aspects of the present inventions, which are described and/or claimed below. This discussion is believed to be helpful in providing the reader with background information to facilitate a better understanding of the present inventions. Accordingly, it should be understood that these statements are to be read in that light, and not as admissions of prior art.

Traditionally, hay and other agricultural materials have been compacted into relatively small rectangular bales for storage, etc. Because of their size and weight, old style rectangular bales were adapted for manual handling. However, more recently, the use of round bales has become popular. Round bales are actually cylindrical in shape and are characterized by diameters of six feet or more and by axial lengths of three feet or more. Due to their considerable mass and volume, round bales can not be handled manually. Rather, the use of mechanical devices, such as tractors, is necessary in order to properly move these round bales.

Previously, various tractor mounted devices have been provided for use in handling round bales. Prior round bale handling systems have generally been of two types: rear mounted devices and front mounted devices. The rear mounted devices have typically been comprised of forks, prongs or bale spears fixedly attached to a frame for attachment to a tractor which extend rearwardly from the tractor and are supported on a hitching mechanism of the tractor for actuation thereby. Front mounted devices comprise additional accessories adopted for use with apparatus permanently affixed to the tractor for actuating such attachment, such as lifting forks, dozer blades, etc.

Conventional bale moving devices typically exhibit a number of mechanical limitations or drawbacks which generally restrict their utility to rather specific and limited adaptations. For example, the transport of large bales is often hazardous and may approach or exceed stability limitations of the transporting tractor. The bulk and weight of the lifted bale substantially alters and shifts the gravitational center of the transporting tractor. This problem becomes particularly acute when the tractor is transporting the bale over uneven or steep terrain.

Crop production requires highly intensive labor, especially during harvest time. Farm producers must have the ability to timely and expeditiously perform a number of activities around the farm within a short period of time. Weather conditions may abruptly change and spoil crops necessitating long hours of activity.

Conventional bale spears systems attachable to tractors permanently extend the bale spears in a position rearward from the tractor. While these systems are adaptable for use with various types of conventional round bales, these conventional bale spear systems limit the capability of the tractors to perform other tasks by requiring the attachment of different farm equipment to the rear of the tractor at the same time as the bale spear system is being utilized. For example, when the bale spears are extended rearwardly, it is difficult, if not impossible, to use the tractor to pull farm equipment at the same time. In addition, because it is necessary that these bale spear systems be quite sturdy to handle the significant weight of the bales of hay, the attachment and removal of these bale spears systems can be time and labor intensive. It would be preferable for these bale spear systems be designed for attachment to the back of tractors without limiting the additional equipment that can also be attached to the tractor to perform other tasks around the farm.

It is one object of the invention to provide an improved bale spear system which overcomes the difficulties of conventional bale spear systems and permits the utilization of the bale spear system while attached to a tractor at the same time as other farm equipment is also attached to the tractor.

SUMMARY OF THE INVENTION

One embodiment of the present invention relates to a folding bale spear system including a frame, which is securable to a farm implement, such as a tractor, left and right fork posts rotatable secured to the frame, left and right bale spears secured to the left and right fork posts and a means for rotation of the left and right fork posts, which is secured to the fork posts, such that in an open position, the bale spears are extended rearwardly from the frame and in a closed position, the bale spears cross each other without interference and are rotatable to a position substantially parallel to the frame, so that the bale spears do not interfere with the utilization of the tractor with other farm equipment when the bale spear system is attached to the tractor.

In one embodiment, the means for rotation of the left and right fork posts comprises a hydraulic cylinder and other components attachable to a hydraulic system of the tractor.

In a further embodiment, the means for rotation of the fork posts comprises a spring system secured to the fork posts.

DETAILED DESCRIPTION

While the present invention embodies various forms and is not limited by the disclosure contained within the drawings or the detailed description, the drawings describe presently preferred embodiments and should be considered as an exemplification of at least one invention disclosed herein, but are not intended to limit the invention to the specific embodiments described herein.

Referring to the drawings, FIGS. 1-6 disclose one embodiment of the folding bale spear system (1), wherein the folding bale spear system includes a frame (10) with a pair of vertical frame members (12,14) and a horizontal frame member (16) secured between the vertical frame members. Preferably, the two vertical frame members (12,14) are formed from rectangular tubular steel, although other shapes can also be used. Their overall height, width and length may also vary depending upon the overall size of the bale spear system. In one embodiment these vertical frame members are rectangular in cross section and from about 24 to 48 inches in length. (See FIG. 1) Secured to these vertical frame members is at least one horizontal frame member (16). The size and shape of this horizontal frame member is also not critical. In one embodiment, it comprises a square cross section tubular element of about 24 to 48 inches in length, which is secured to the two vertical frame members by conventional securing means, such as welding. The horizontal frame member can be secured to the vertical frame members at any location on the vertical frame members. More than one horizontal frame member can be used to provide stability to the frame, if desired.

Figure 1:
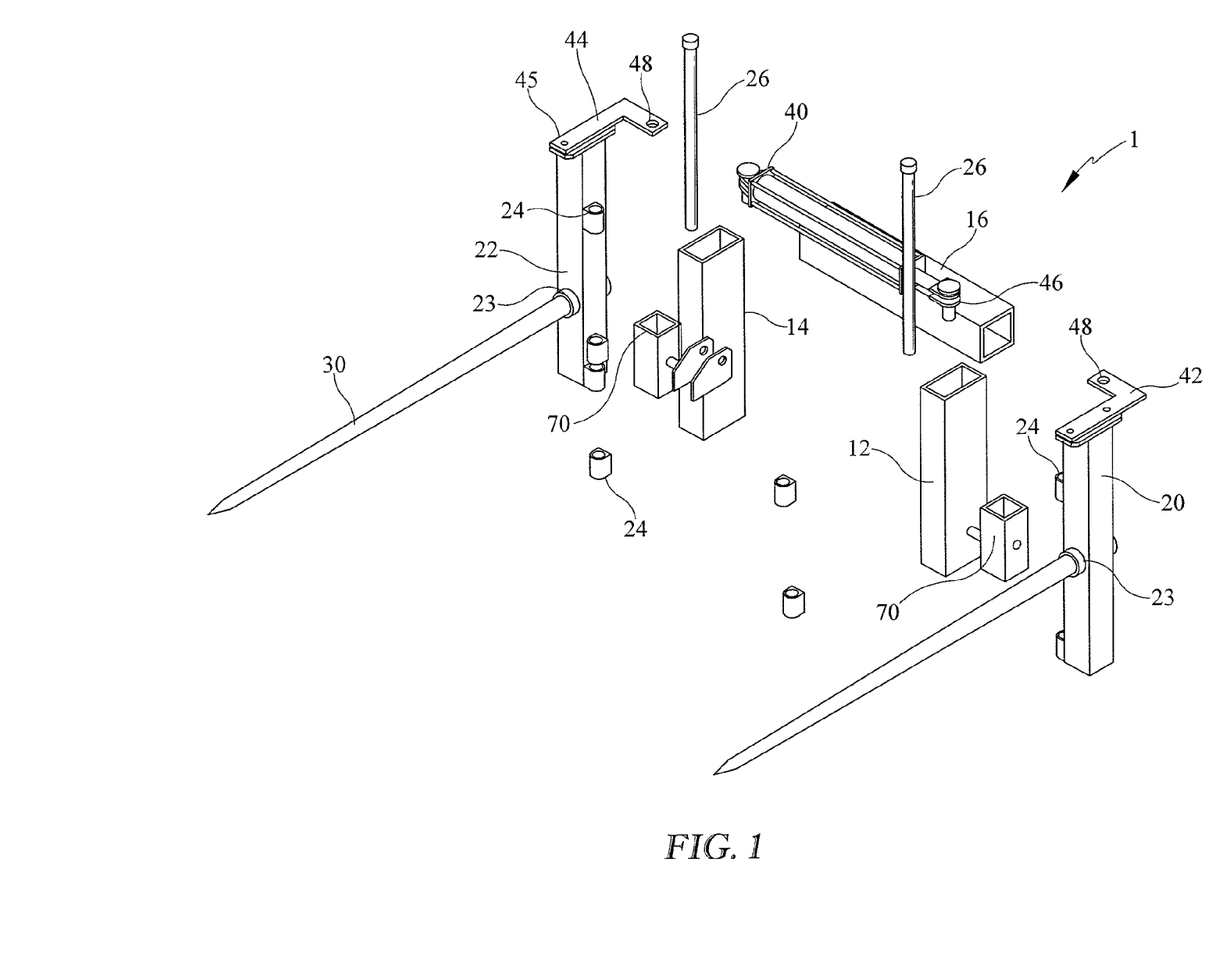
FIG. 1 is an exploded view of a first embodiment of the folding bale spear system.
Figure 2:
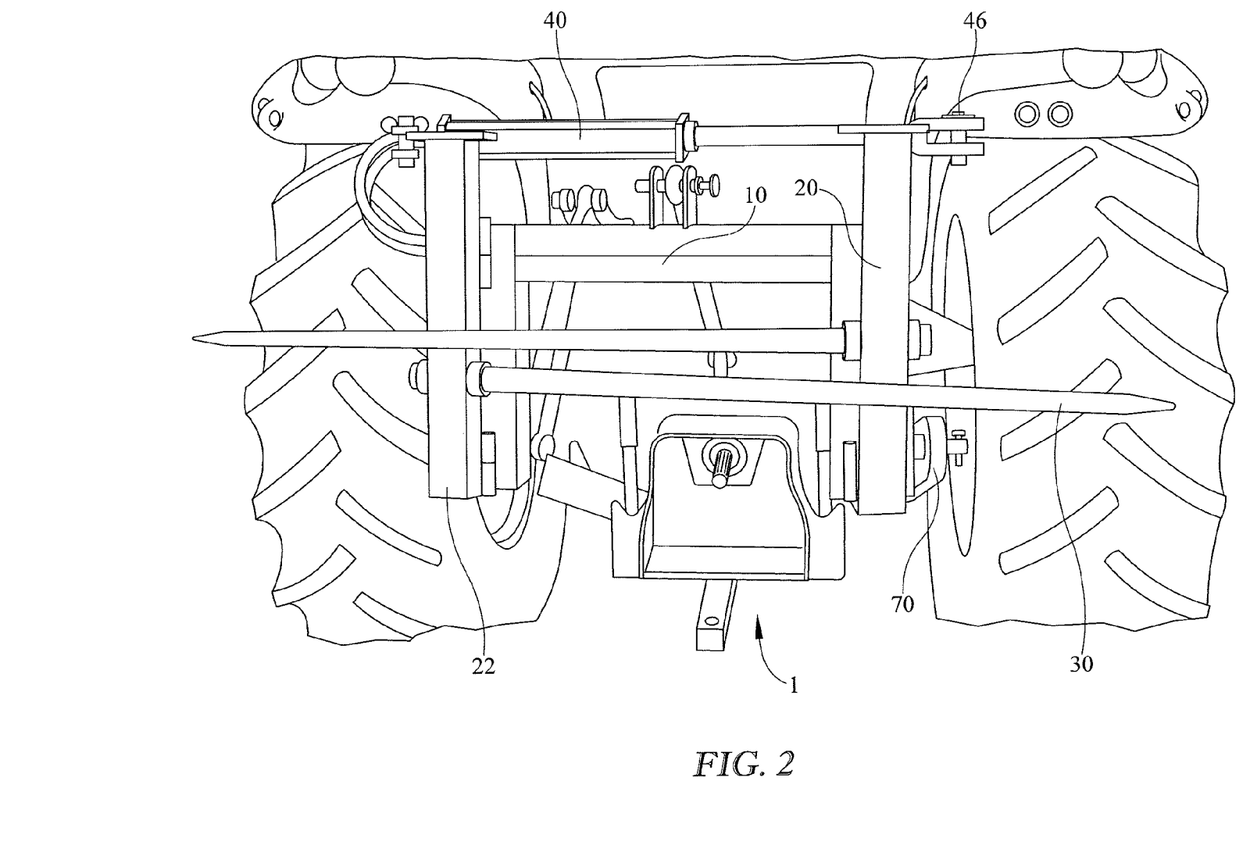
FIG. 2 is an end view of the first embodiment of the folding bale spear system secured to a tractor with the left and right bale spears rotated to a closed, crossed position substantially parallel with a frame of the folding bale spear system.

In one embodiment, rotatably secured to this frame (10) are a pair of fork posts (20,22). Secured to each fork posts is a bale spear (30), as shown in FIGS. 1-5. The bale spear can be secured to the fork posts by any conventional securing structure. For example, each fork post may include a fork post bushing (23) secured to the fork post into which the bale spear is secured, as shown in FIG. 1. In a preferred embodiment the bushing for one of the bale spears is secured at a location on the respective fork post higher than the second bale spear, which is secured to the second fork post, as shown, for example, in FIG. 3, so that upon rotation of the bale spears toward a closed position, as shown in FIG. 2, they do not contact each other while being rotated to that closed position. These bale spears are conventional forks, generally consisting of tapered long spears of tempered hardened steel, preferably at least 48 inches in length, which are used to poke into round or square bales of hay or other products, as desired.

Figure 3:
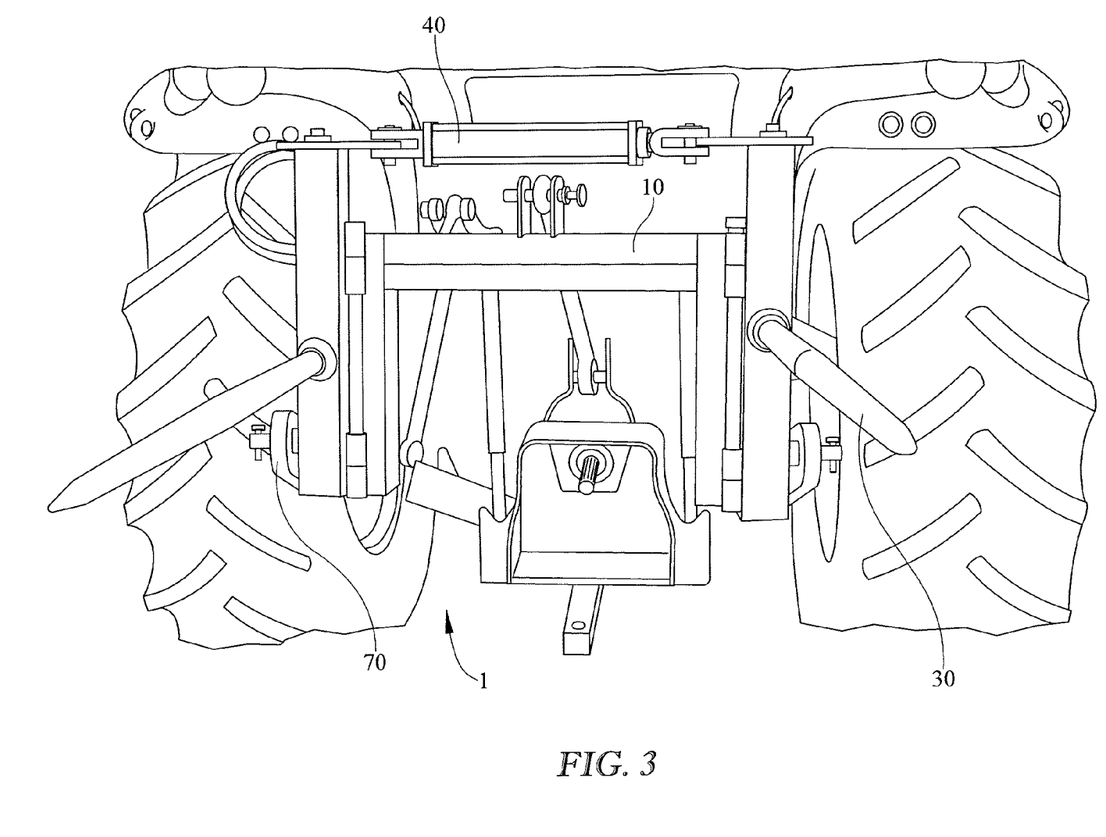
FIG. 3 is a second end view of the folding bale spear system of FIG. 2 wherein the bale spears have been rotated to an open position extending rearwardly from the frame of the folding bale spear system.

As previously stated, the fork posts (20, 22) are rotatably secured to the vertical frame members (12, 14) so that the fork posts may rotate at least about 60 degrees, up to 120 degrees, about the vertical frame members. Various methodologies may be used to rotatably secure the fork posts to the vertical frame members. In one embodiment, there is secured to each of the fork posts and each of the vertical frame members a pair of pin rail bushings (24), each of which contains a circular opening passing therethrough. (See FIG. 1) When each fork post is placed next to the corresponding vertical frame member, the openings in these pin rail bushings line up so that a fork pin (26) can pass through each of the openings in the pin rail bushings to form a hinge between the fork post and its corresponding vertical frame member, as shown in FIG. 3. The fork pins should be sufficient in length to extend through all four pin rail bushings on each combination of fork post and vertical frame member. In addition, once each fork pin is present in the pin rail bushings, it is secured in that position by conventional securing systems so that the fork pins do not come out of the pin rail bushings during use. By placement of the fork pin in the pin rail bushings, each of the fork posts (20,22) are able to rotate about the respective vertical frame members (12, 14). By securing these pin rail bushings on an outside surface of the vertical frame members and on an inside surface of the respective fork posts relative to each other, the fork posts are rotatably secured to the outside of the vertical frame members and rotate about the vertical frame members. So that the rotation is appropriate, the pin rails should be secured toward the front edge of both the fork posts and the vertical frame members, as shown in FIG. 1. Once the fork pins are secured in position within the pin rail bushings and the fork posts are secured to the vertical frame members, the fork posts rotate about the vertical frame members. When the bale spears are secured to the front of the fork posts members, as shown in FIG. 1, they can rotate and cross each other from a position where they extend rearwardly from the frame, as shown in FIG. 3, to a position where they cross and are substantially parallel to the frame in a closed position, as shown in FIG. 2. Because of the difference of the height in placement of the bale spears on the respective vertical frame members, rotation of one bale spear does not interfere with the rotation of the other bale spear, as shown in FIG. 2.

Figure 4:
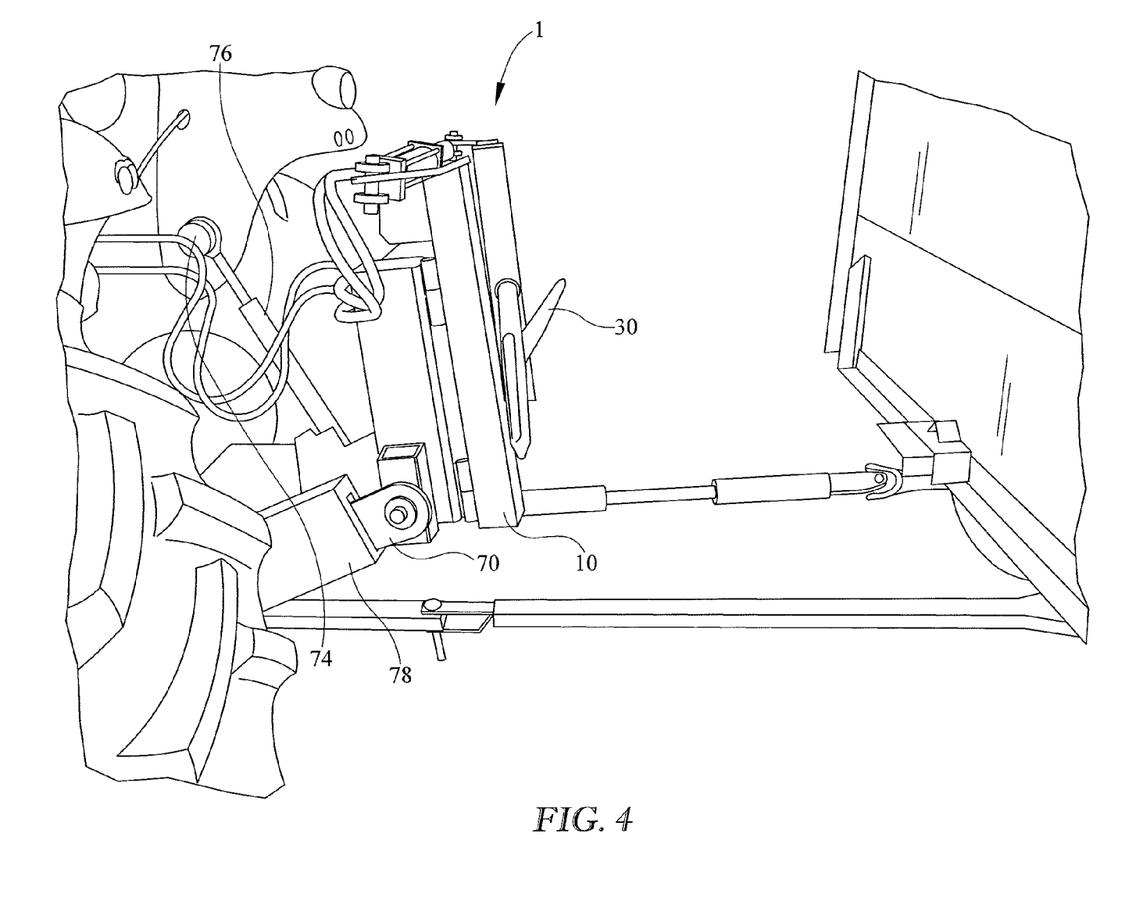
FIG. 4 is a side view of the folding bale spear system of FIG. 2 with the bale spears folded in a position that is crossed and substantially parallel to the frame of the folding bale spear system, wherein there is also secured to the tractor other farm equipment.
Figure 5:
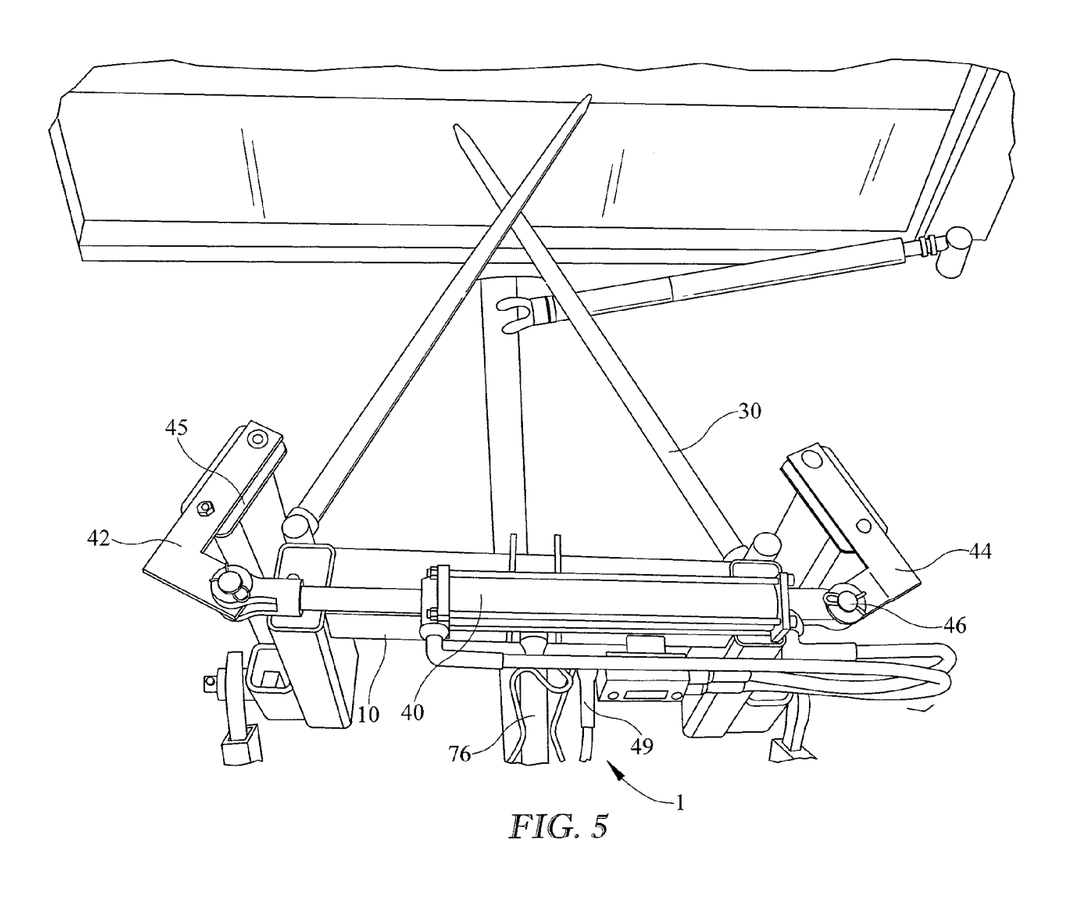
FIG. 5 is a top view of the folding bale spear system of FIG. 2 with the bale spears extended rearwardly and interfering with the attachment of other farm equipment to the tractor.

One embodiment of the folding bale spear system utilizes as a means to cause the rotation of the fork posts (20, 22) an hydraulic cylinder (40). This hydraulic cylinder can be a conventional hydraulic cylinder. In one preferred embodiment, as shown in FIGS. 2, 3 and 4, one end of the hydraulic cylinder is secured to each of the fork posts by securing them to an hydraulic plate (42,44), which is itself secured to a top surface of the respective fork posts, as shown in FIGS. 1 and 5. These hydraulic plates, in one embodiment, are L-shaped plates, as shown in FIGS. 1 and 5, and the fork post plate (45) is a rectangular plate. The longer end of the L of the hydraulic plate is secured to the fork post plate (45), that is itself secured to the top surface of the fork posts, with the shorter leg of the L-shaped fork post plate extending inwardly from the fork posts when the bale spears are extended rearwardly. The hydraulic cylinder is secured between these two hydraulic plates, as shown in FIGS. 4 and 5. In one method for securing the hydraulic cylinder to the hydraulic plates, hydraulic pins (46) are secured through openings in the ends of the hydraulic cylinder into openings (48) in the L-shaped hydraulic plates. By this method of securing, the hydraulic cylinder operates between the two fork posts. As the hydraulic cylinder expands and contracts, it rotates the respective fork posts, which then rotate the respective bale spears. The hydraulic cylinder is attachable to a conventional hydraulic system of the farm implement, such as a tractor, to which the folding bale spear system has been secured. Operation of this hydraulic cylinder rotates each of the bale spears from an open position, as shown in FIG. 3, wherein the bale spears extend rearwardly from the frame to a closed position, as shown in FIG. 2, where the bale spears cross and are rotated to a position substantially parallel to the frame.

In addition, a bypass valve (49), as shown in FIG. 5, can be secured to the hydraulic system used to regulate the pressure sent to the hydraulic cylinder (40). This bypass valve prevents the bale spear system from folding and damaging the system in case an operator attempts to activate the system at the same time a round bale is secured to bale spears of the system.

Figure 6:
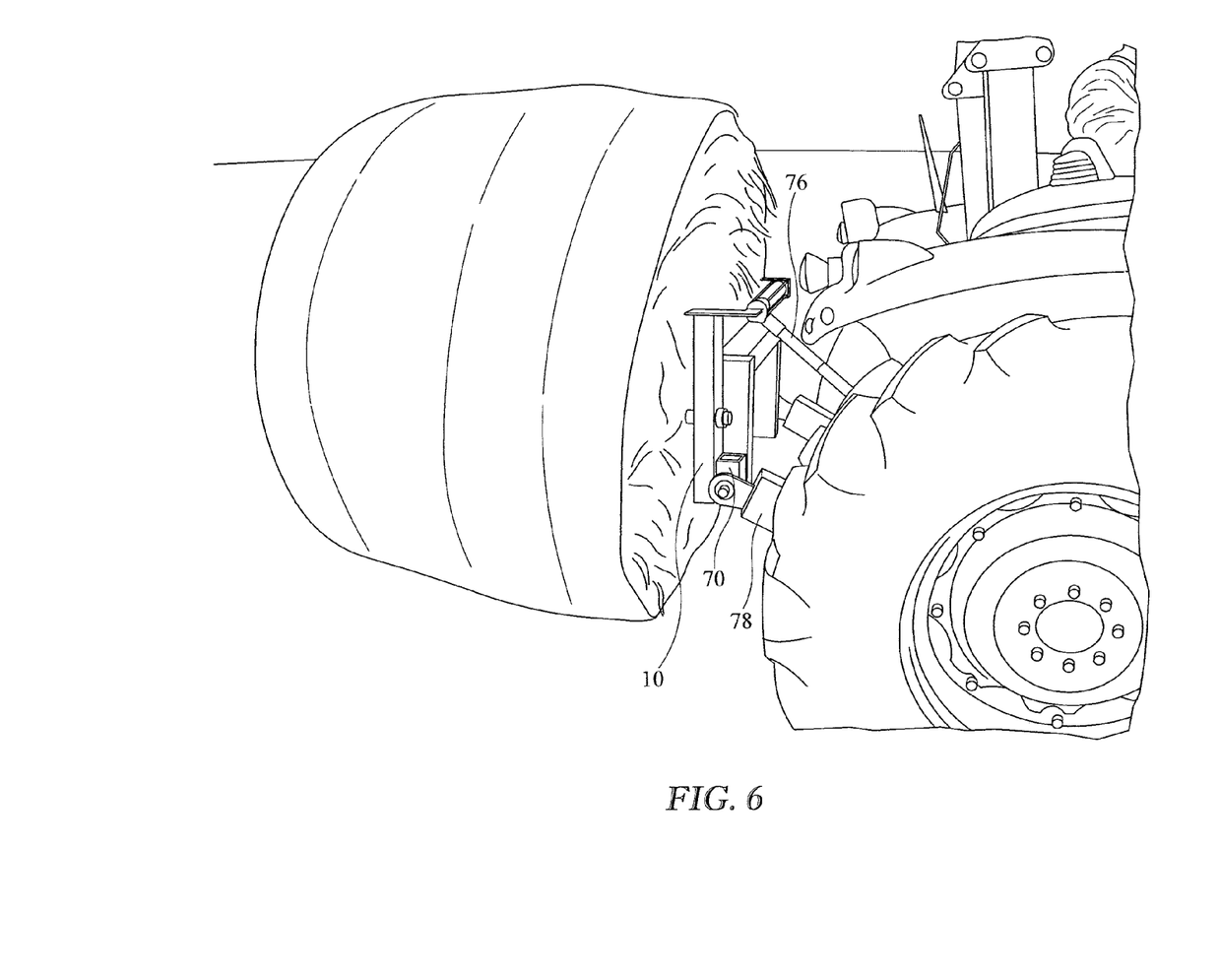
FIG. 6 is a side view of the folding bale system of FIG. 2 lifting a round bale of hay.
Figure 7:
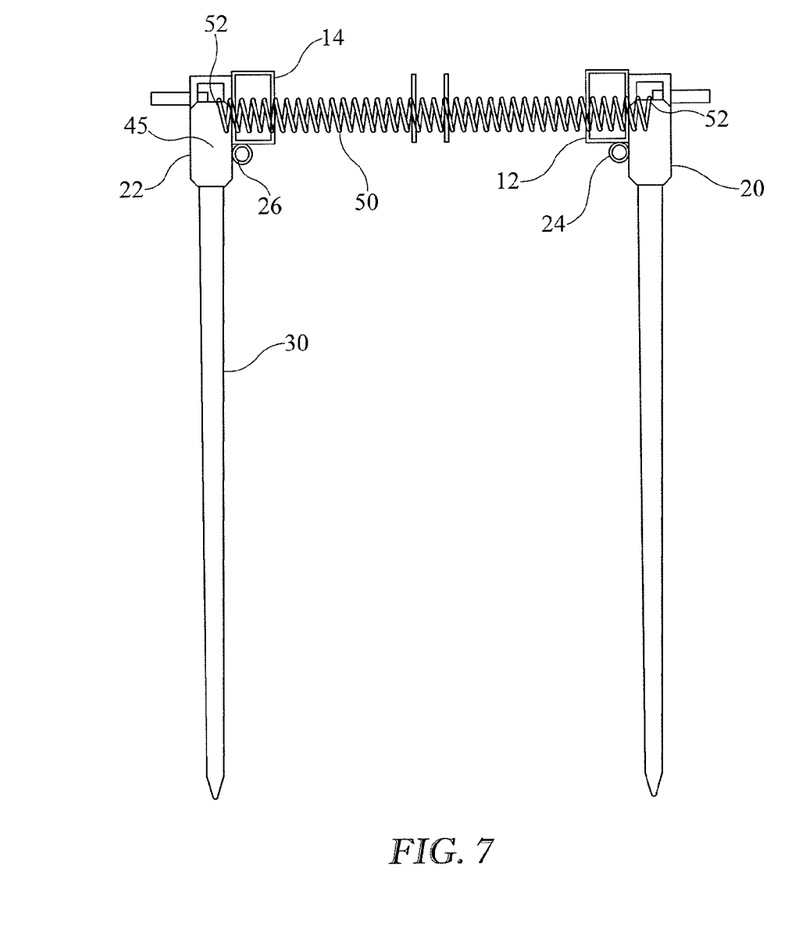
FIG. 7 is a top view of a second embodiment of the folding bale spear system with the bale spears extended rearwardly from a frame of this system.
Figure 8:
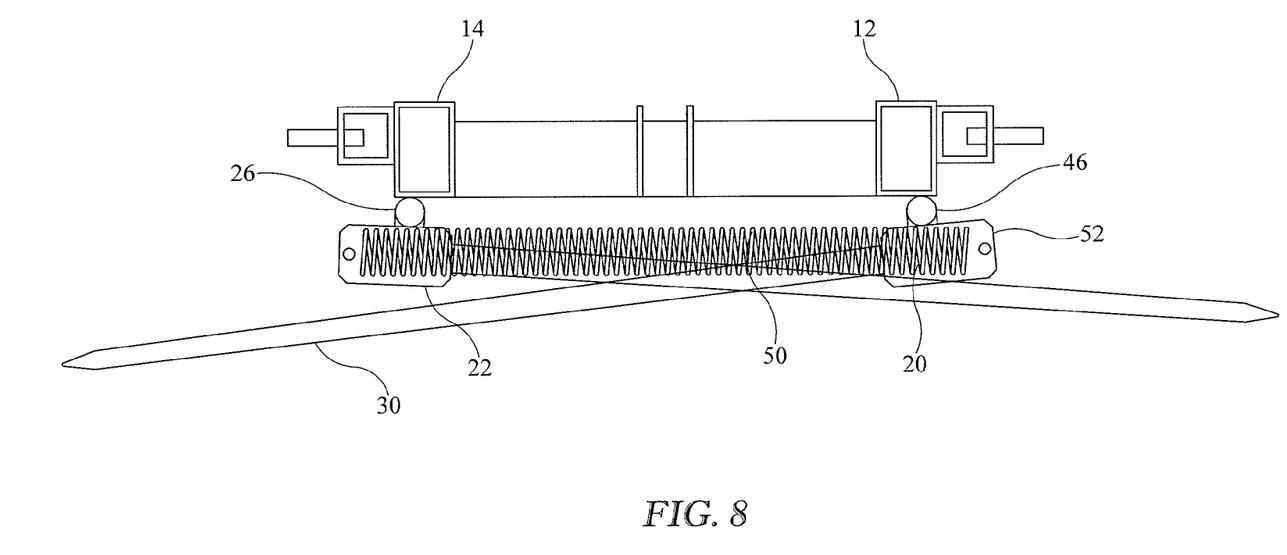
FIG. 8 is a top view of the second embodiment of the folding bale spear system of FIG. 7 with the bale spears in a closed position, wherein the bale spears have been crossed and rotated to a position substantially parallel to the frame of the folding bale spear system.

An alternative embodiment for a means for rotation of the bale spears is disclosed in FIGS. 7 and 8. This embodiment uses a spring (50) which runs between the two fork posts (20, 22). Each end of the spring is secured to one of the fork posts by securing it first to a spring pin (52) that is secured to a fork post plate (45). As with the hydraulic system embodiment as shown in FIGS. 1-6, the fork posts rotate about the vertical frame members (12, 14) by use of fork pins (26) placed in pin rail bushings (24), which pin rail bushings are secured to both the vertical frame members and the fork posts. When the bale spears (30) are extended rearwardly from the frame, tension on the spring is reduced, as shown in FIG. 7. Once the bale spears are rotated such that they cross and end up substantially parallel with each other, tension is also reduced because of the position chosen for the pivot point of the bale spear, as shown in FIG. 8. By manual rotation of the fork posts, the bale spears can be rotated from an open position to a closed position. Because the tension on the spring for the bale spear system is least when the bale spears are either completely open or completely closed, the bale spear system operates safely. The use of this spring system works well with tractors with inadequate hydraulics or where the hydraulics of the tractor must be used for other attachments, such as a loader. Notwithstanding, a hydraulic system to operate this bale spear system can be added at a later date.

It is necessary for the folding bale spear system (1) also to be securely attached to the back of a tractor. To assist in this attachment, a three point hitch (74) is used. One end of an upper element (76) of the three point hitch (74) is secured to the frame (10) and the other end of the upper element (76) is secured to the tractor, as shown, for example, in FIGS. 4 and 6. The other two points of the three point hitch are also secured to the frame (10) of the folding bale spear system. For example, as shown in FIGS. 4 and 6, frame side rails (70) are secured to the side of the vertical frame (12, 14) as shown in FIGS. 1 and 4. Two draw bars (78) of the three point hitch (74) are extended from the tractor to be secured to these side rails. Because the side rails are firmly secured to the outside surface of the vertical frame members, this method of attachment provides a secure method for attaching the folding bale spear system to the three point hitch of the tractor.

Because of the capability of the embodiments of the folding bale spear system to permit the folding of the bale spears from a position extending rearwardly from the frame to a crossed position, which is substantially parallel to the frame, other farm equipment can be attached to the tractor without removing the folding bale spear system from the tractor, such as a draw bar, hitch or PTO shaft, an example of which is shown in FIG. 4.

In operation, the hydraulic folding bale spear system is secured to the back of the tractor by use of the side rails (70) and the upper element (76) of the three point hitch. The hydraulics of the tractor are secured to the hydraulic cylinder (40) which forms an integral part of one embodiment of the folding bale spear system. By use of this hydraulic system, the bale spears (30) can be rotated from a closed position, where the bale spears are crossed and substantially parallel to the frame to an open position extending rearwardly from the frame. In this position, the bale spears can be used for picking up large round or square bales. After the bale spear system has been used and the large round or square bale has been removed from the bale spears, the hydraulic system rotates the bale spears across each other to a closed position. In this position the bale spear system can remain attached to the tractor while still allowing the tractor to be used with other farm equipment. Instead of using an hydraulic system, the spring system, as shown in FIGS. 7 and 8, can alternatively be used to rotate the bale spears from an open position to a closed position.

It should be understood that the foregoing description is only illustrative of an embodiment of the invention. Various alternatives and modifications can be derived by those skilled in the art without departing from the scope of the invention. The present invention is intended to embrace alternatives, modifications and variances which fall within the scope of the attached claims.

The invention claimed is:

1. A folding bale spear system comprising
a frame mounted to the rear of a tractor,
left and right fork posts, rotatably secured to the frame,
left and right bale spears, one secured to the left fork post and one secured to the right fork post, wherein one of the bale spears is secured to one of the fork posts in a position, when secured to the farm implement, which is located higher above the ground than the other bale spear, and
a means for rotation of the left and right fork posts, which means is secured to the fork posts, such that in an open position, the bale spears are extended rearwardly from the frame and, in a closed position, the bale spears are rotated to cross each other to a position substantially parallel to the frame,
wherein the means for rotation of the fork posts comprises a hydraulic cylinder secured between the fork posts and attachable to an hydraulic system of the tractor,
wherein the frame comprises a pair of vertical frame members, to which the left and right fork posts are rotatably secured, and a horizontal frame member secured between the pair of vertical frame members,
wherein a pair of fork pins rotatably secure the left and right fork posts to the pair of vertical frame members,
wherein the left and right fork posts comprise a pair of pin rail bushings, and
wherein the vertical frame members further comprise a second pair of pin rail bushings which operate in coordination with the fork pins such that the fork posts can rotate at least 60 degrees in rotation about the fork pins when rotated by the rotation means.

2. The folding bale spear system of claim 1, wherein the hydraulic cylinder rotates both the left and right fork posts simultaneously such that the left and right bale spears are moved from a substantially parallel position with respect to the frame to a position substantially vertical to the frame.

3. The folding bale spear system of claim 1, wherein the hydraulic cylinder is secured to a pair of hydraulic plates which plates are secured to a top of the left and right fork posts.

4. The folding bale spear system of claim 1, wherein the frame further comprises a pair of side rails, one secured to each of the fork posts.

5. The folding bale spear system of claim 4, wherein the frame is secured to the farm implement by attachment of the farm implement to each of the side rails.

6. The folding bale spear system of claim 1 further comprising a bypass valve secured to the hydraulic system of the farm implement, which regulates the pressure sent to the hydraulic cylinder.

7. A folding bale spear system comprising a frame mounted to the rear of a tractor, left and right fork posts, rotatably secured to the frame, left and right bale spears, one secured to the left fork post and one secured to the right fork post, wherein one of the bale spears is secured to one of the fork posts in a position, when secured to the farm implement, which is located higher above the ground than the other bale spear, and a means for rotation of the left and right fork posts, which means is secured to the fork posts, such that in an open position, the bale spears are extended rearwardly from the frame and, in a closed position, the bale spears are rotated to cross each other to a position substantially not shown parallel to the frame, wherein the means for rotation of the fork posts comprises a spring secured between the left and right fork posts, wherein the frame comprises a pair of vertical frame members, to which the left and right fork posts are rotatably secured, and a horizontal frame member secured between the pair of vertical frame members, wherein a pair of fork pins rotatably secure the left and right fork posts to the pair of vertical frame members, wherein the left and right fork posts comprise a pair of pin rail bushings, and wherein the vertical frame members further comprise a second pair of pin rail bushings which operate in coordination with the fork pins such that the fork posts can rotate at least 60 degrees in rotation about the fork pins when rotated by the rotation means.

\* \* \* \* \*